(12) United States Patent
Fujisawa et al.

(10) Patent No.: US 10,913,333 B2
(45) Date of Patent: Feb. 9, 2021

(54) AIR-CONDITIONING REGISTER FIN

(71) Applicant: TOYODA GOSEI CO., LTD., Kiyosu (JP)

(72) Inventors: Hitoshi Fujisawa, Kiyosu (JP); Masaki Otake, Kiyosu (JP); Yasuyuki Mitsui, Kiyosu (JP); Kenichi Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 194 days.

(21) Appl. No.: 16/118,502

(22) Filed: Aug. 31, 2018

(65) Prior Publication Data
US 2019/0084379 A1  Mar. 21, 2019

(30) Foreign Application Priority Data

Sep. 20, 2017 (JP) .................................. 2017-180364

(51) Int. Cl.
*B60H 1/34* (2006.01)
*B60R 13/02* (2006.01)

(52) U.S. Cl.
CPC ........... *B60H 1/3421* (2013.01); *B60R 13/02* (2013.01); *B60H 2001/3492* (2013.01)

(58) Field of Classification Search
CPC ................ B60H 1/3421; B60H 2001/3492
USPC ........................................................ 454/155
See application file for complete search history.

(56) References Cited

U.S. PATENT DOCUMENTS 9,028,307 B2  5/2015  Furukawa

FOREIGN PATENT DOCUMENTS

| DE | 102013107173 A1 | 1/2015 | |
| EP | 1655160 B1 * | 2/2010 | ........... B60H 1/3421 |
| JP | 2015-143381 A | 8/2015 | |
| JP | 2016-147605 A | 8/2016 | |
| JP | 2016-159845 A | 9/2016 | |

OTHER PUBLICATIONS

Office Action dated Sep. 8, 2020 issued in corresponding JP patent application No. 2017-180364 (and an English translation).

* cited by examiner

*Primary Examiner* — Steven B McAllister
*Assistant Examiner* — Allen R Schult
(74) *Attorney, Agent, or Firm* — Posz Law Group, PLC

(57) ABSTRACT

An air-conditioning register fin includes an elongated plate-shaped fin main body and an elongated decorative member attached to one of edges of the fin main body in a transverse direction. One of the fin main body and the decorative member includes an engagement projection. The other one of the fin main body and the decorative member includes a recess that accommodates the engagement projection and an engagement hook projecting from an inner surface of the recess. The engagement hook holds and engages the engagement projection.

5 Claims, 4 Drawing Sheets

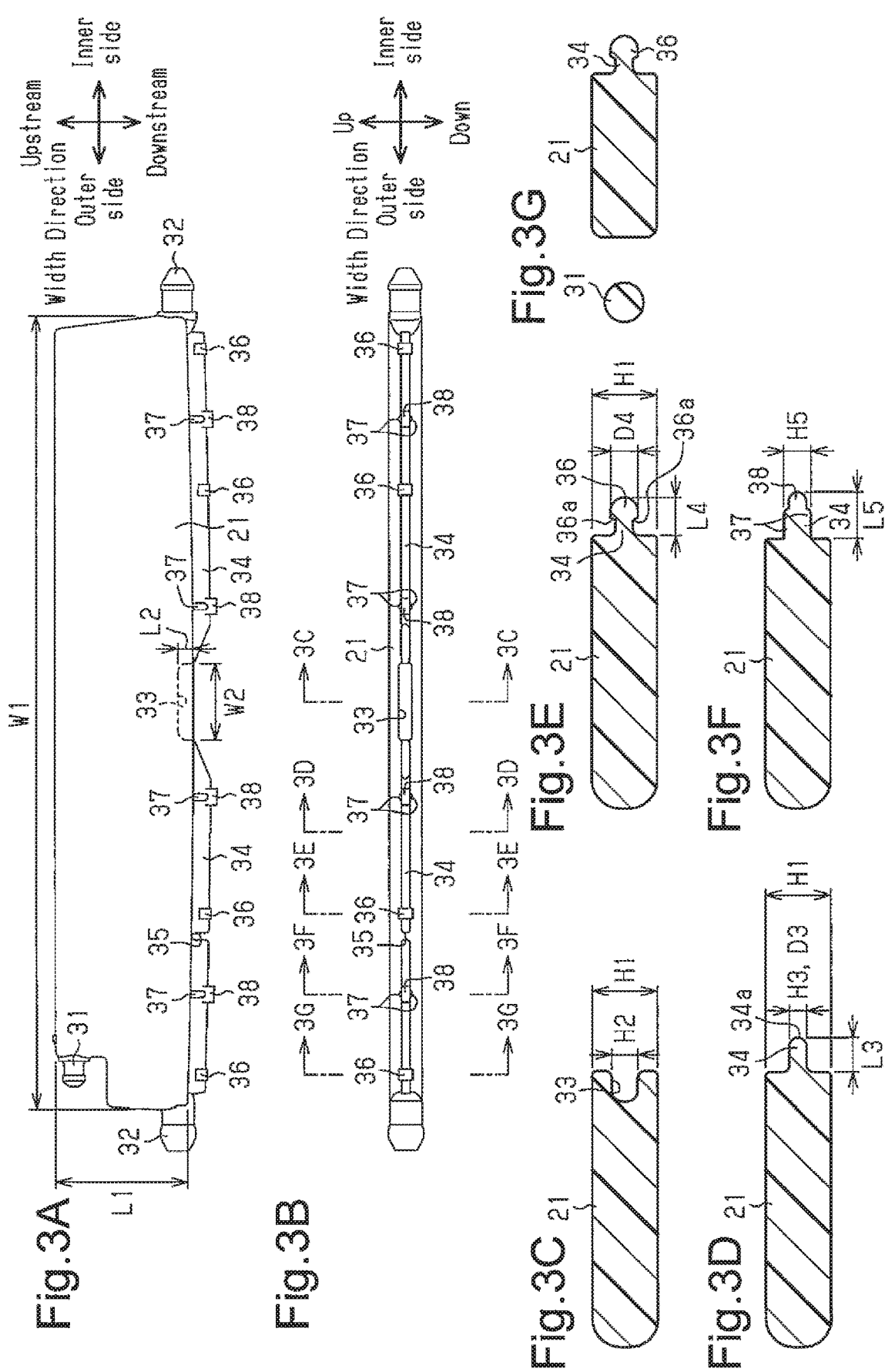

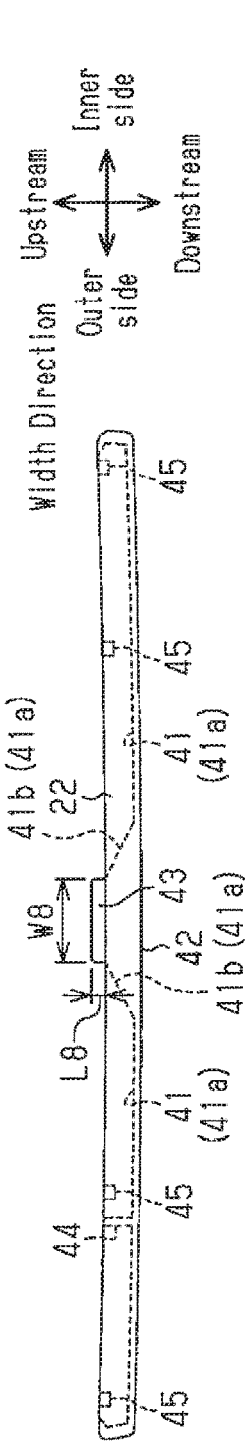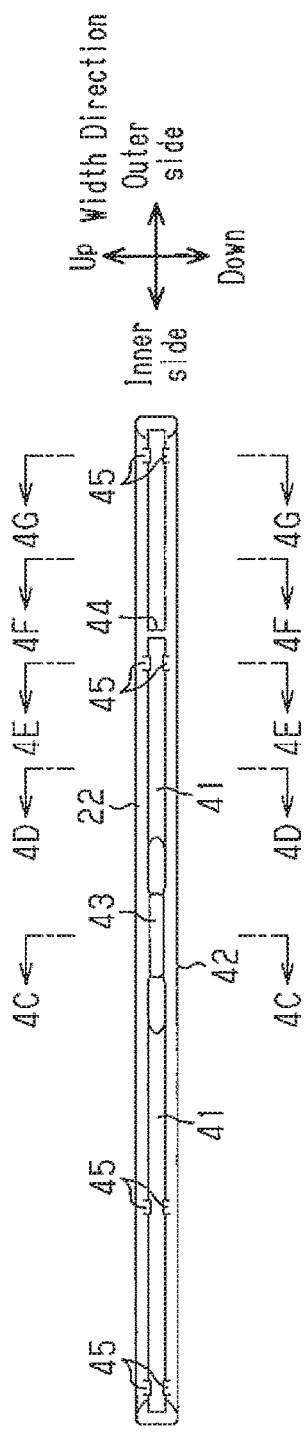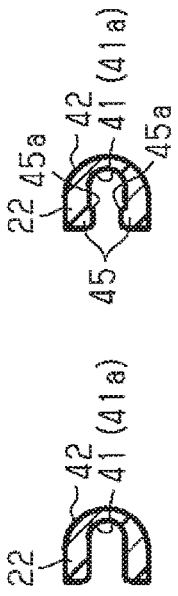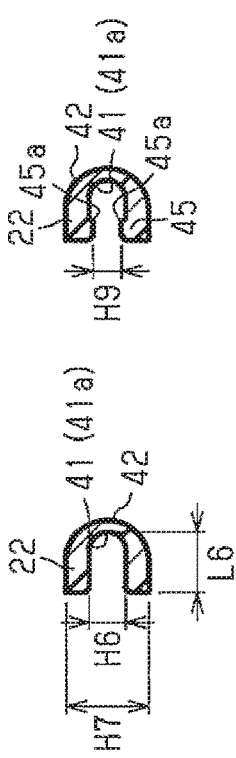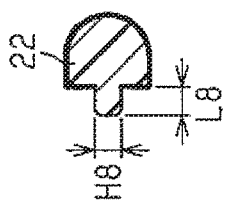

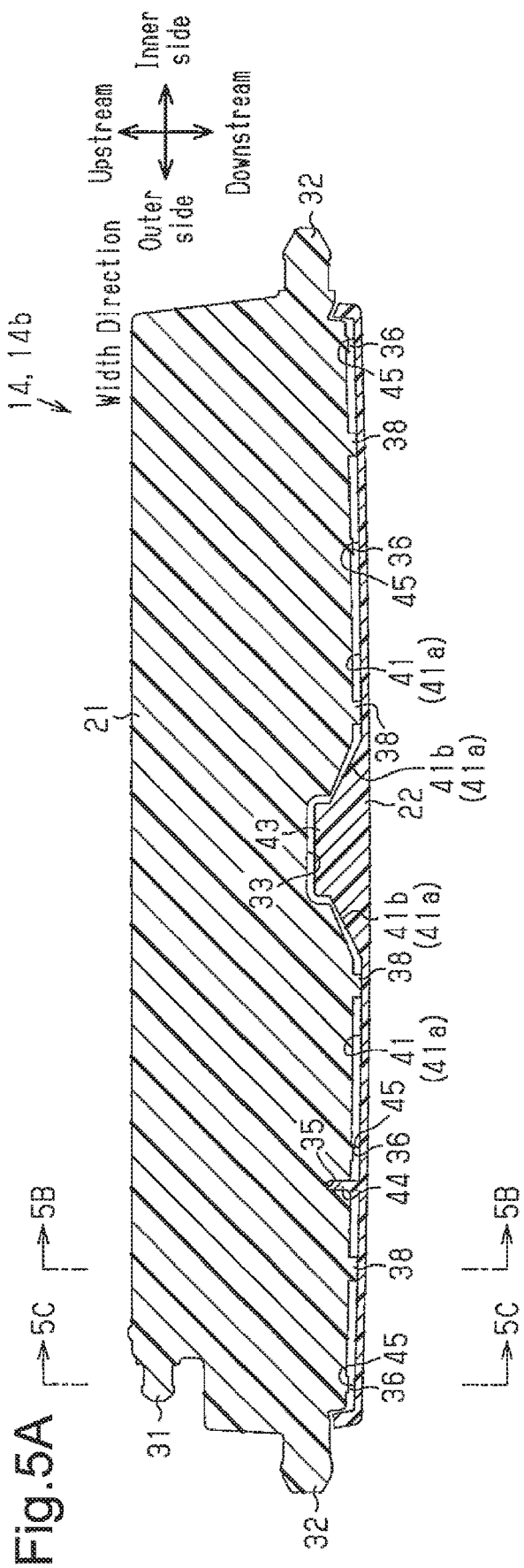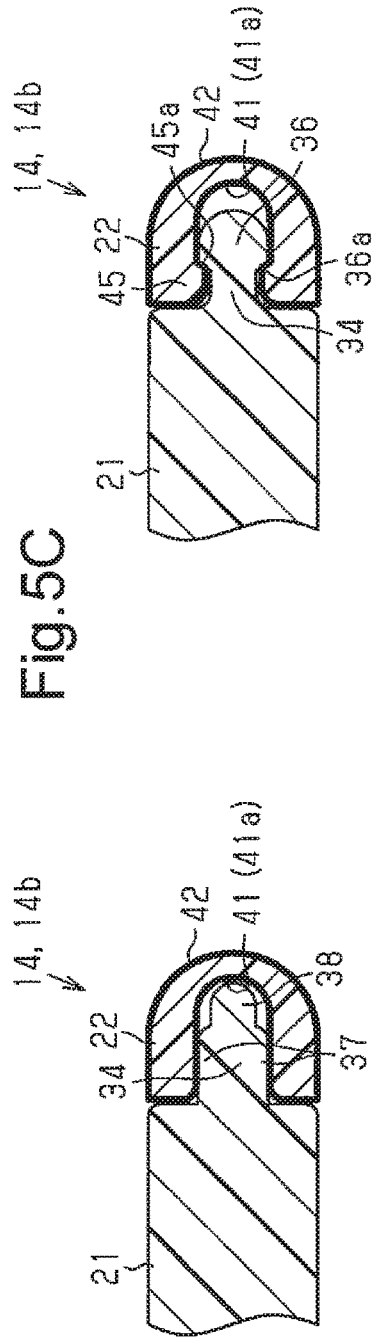

US 10,913,333 B2

AIR-CONDITIONING REGISTER FIN

BACKGROUND OF THE INVENTION

The present invention relates to fins provided in an air-conditioning register.

Conventionally, the instrument panel of an automobile includes a register that changes how air-conditioning air is blown out from the air-conditioning device. The register includes a retainer, which includes an air passage, and plate-shaped fins. The fins are swingably supported by the retainer and change the direction in which air-conditioning air is blown out (refer to, for example, Japanese Laid-Open Patent Publication No. 2016-159845).

In such a register, for example, a plated bar-shaped decorative member may be provided on the downstream edge of the fin main body for the fins to look luxurious. In this case, when attaching the decorative member to the edge of the fin main body using adhesive, the following problems occur. The edge of the fin main body and the decorative member are both thin. Thus, when a large amount of adhesive is applied to the mating surface of the fin main body and the decorative member, the adhesive leaks from the mating surface, lowering the aesthetic appeal of the register. When a small amount of adhesive is applied, the adhesive force is insufficient. This causes the decorative member to easily separate from the fin main body. Thus, it will be difficult to manage the amount of adhesive applied when attaching the fin main body and the decorative member using adhesive.

SUMMARY OF THE INVENTION

It is an object of the present invention to provide an air-conditioning register fin that allows a decorative member to be easily attached to a fin main body.

To solve the above problem, an air-conditioning register fin is configured to be swingably attached to a cylindrical retainer having an air passage for air-conditioning air. The air-conditioning register fin includes an elongated plate-shaped fin main body and an elongated decorative member attached to one of edges of the fin main body in a transverse direction. One of the fin main body and the decorative member includes an engagement projection, and the other one of the fin main body and the decorative member includes a recess that accommodates the engagement projection and an engagement hook projecting from an inner surface of the recess. The engagement hook holds and engages the engagement projection.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a top view showing a fin main body;

FIG. 3B is a front view showing the fin main body;

FIG. 3C is a cross-sectional view taken along line 3C-3C in FIG. 3B;

FIG. 3D is a cross-sectional view taken along line 3D-3D in FIG. 3B;

FIG. 3E is a cross-sectional view taken along line 3E-3E in FIG. 3B;

FIG. 3F is a cross-sectional view taken along line 3F-3F in FIG. 3B;

FIG. 3G is a cross-sectional view taken along line 3G-3G in FIG. 3B;

FIG. 4A is a top view showing a decorative member;

FIG. 4B is a front view showing the decorative member;

FIG. 4C is a cross-sectional view taken along line 4C-4C in FIG. 4B;

FIG. 4D is a cross-sectional view taken along line 4D-4D in FIG. 4B;

FIG. 4E is a cross-sectional view taken along line 4E-4E in FIG. 4B;

FIG. 4F is a cross-sectional view taken along line 4F-4F in FIG. 4B;

FIG. 4G is a cross-sectional view taken along line 4G-4G in FIG. 4B;

FIG. 5A is a cross-sectional view showing the air-conditioning register fin with the decorative member attached to the fin main body;

FIG. 5B is a cross-sectional view taken along line 5B-5B in FIG. 5A; and

FIG. 5C is a cross-sectional view taken along line 5C-5C in FIG. 5A.

DETAILED DESCRIPTION OF THE PREFERRED EMBODIMENTS

An air-conditioning register provided with air-conditioning register fins according to one embodiment now be described with reference to the drawings.

Air-Conditioning Register

Figure 1:
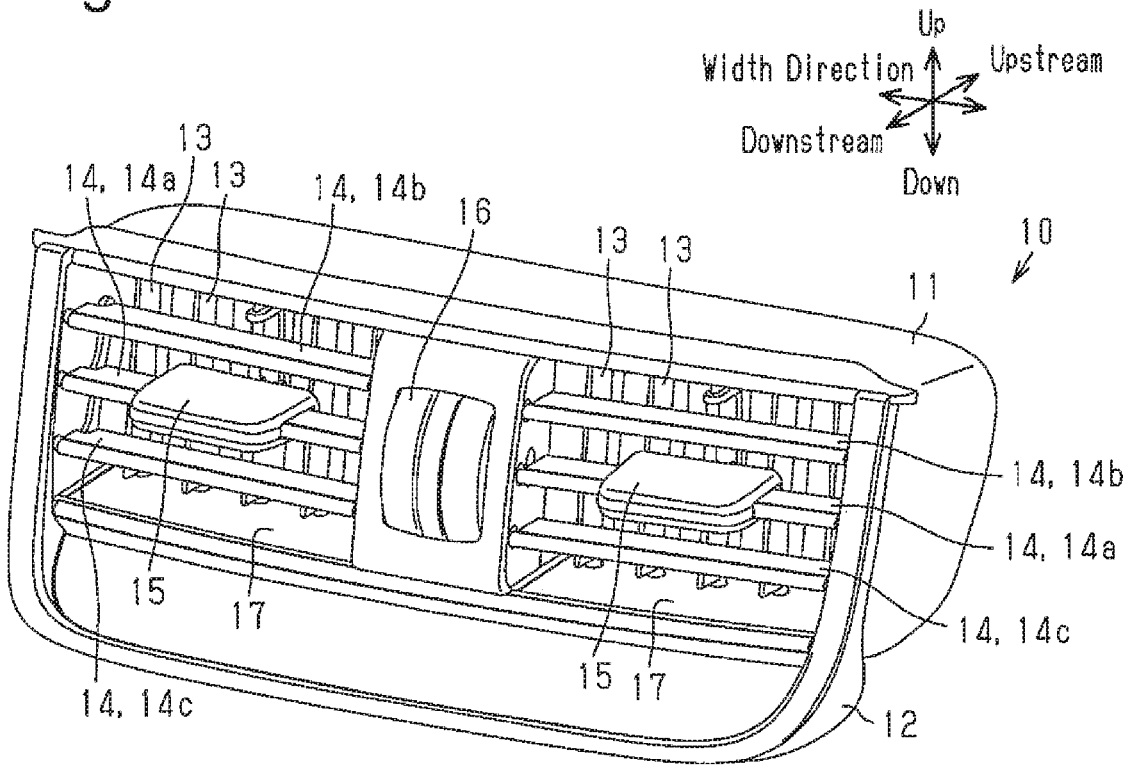
FIG. 1 is a perspective view showing the schematic structure of an air-conditioning register.

FIG. 1 shows an air-conditioning register 10 incorporated in the instrumental panel of an automobile or the rear of the center console. The air-conditioning register 10 includes a retainer 11, a bezel 12, multiple upstream fins 13, multiple downstream fins 14, two operation knobs 15, and an operation dial 16.

The retainer 11 is made of a hard plastic such as polypropylene and includes two air passages 17 arranged in the width direction of the vehicle. The air passages 17 are substantially shaped like a rectangular tube and connected to an air conditioning device (not shown) at the upstream side. The air passages 17 each function as a flow passage for air-conditioning air delivered from the air conditioning device.

The operation dual 16 is rotationally arranged at the middle portion of the retainer 11 in the width direction. Operation of the operation dial 16 switches the shut-off damper (not shown) between open and closed states. This switches the state of the air-conditioning register 10 between the open state, in which the air passages 17 and the air-conditioning device are in communication so that air-conditioning air is supplied to the air passages 17, and the closed state, in which the air passages 17 and the air-conditioning device are disconnected to prevent air-conditioning air from being supplied to the air passages 17.

The bezel 12 is a looped member fixed to the retainer 11 in a manner surrounding the entirety of the two air passages 17. It is desired that the surface of the bezel 12 be plated or the like for the bezel 12 to function to decorate the retainer 11.

Each upstream fin 13 has the form of an elongated plate extending in the vertical direction and is supported to be swingable in the width direction by the upper wall and the lower wall of the air passage 17. Five upstream fins 13 are arranged in each air passage 17 at equal intervals in the width direction. In each air passage 17, the five upstream fins 13 are coupled to each other by a coupling member (not shown). This allows the five upstream fins 13 to integrally swing while being parallel with each other.

Each downstream fin 14 has the form of an elongated plate extending in the width direction and is supported to be swingable in the vertical direction by the inner side wall and the outer side wall of the air passage 17. The inner side wall in the width direction is a wall located on the side where the operation dial 16 is provided, and the outer side wall in the width direction is the wall located opposite to the side where the operation dial 16 is provided.

Three downstream fins 14 are arranged in each air passage 17 at equal intervals in the vertical direction. In each air passage 17, the three downstream fins 14 are coupled to each other by a coupling member (not shown). This allows the three downstream fins 14 to integrally swing while being parallel with each other.

The vertically middle one of the three downstream fins 14 arranged in each air passage 17 is defined as a main fin 14a, the one located above the main fin 14a is defined as an upper sub-fin 14b, and the one located below the main fin 14a is defined as a lower sub-fin 14c. The structure of the downstream fin 14 wall be detailed later. The width direction corresponds to the longitudinal direction of the downstream fin 14, and the depth direction of the register 10 corresponds to the transverse direction of the downstream fin 14.

Each operation knob 15 is attached to the main fin 14a in a manner allowing the operation knob 15 to be slidably operated in the width direction. Each operation knob 15 is coupled to the middle one in the width direction of the five upstream fins 13 arranged in the corresponding air passage 17. As a result, as the operation knob 15 is slidably operated in the width direction, the five upstream fins 13 swing in the width direction. In addition, as the operation knob 15 is operated in the vertical direction, the three downstream fin 14 swing in the vertical direction.

Downstream Fin

The downstream fin 14 will now be detailed. The difference of the main fin 14a from the upper sub-fin 14b and the lower sub-fin 14c is whether or not the operation knob 15 is attached. That is, the main fin 14a, the upper sub-fin 14b, and the lower sub-fin 14c have the same shape. In this example, the description will be given using the upper sub-fin 14b attached to the left air passage 17 in FIG. 1 as a typical example of the downstream fin 14.

Figure 2:
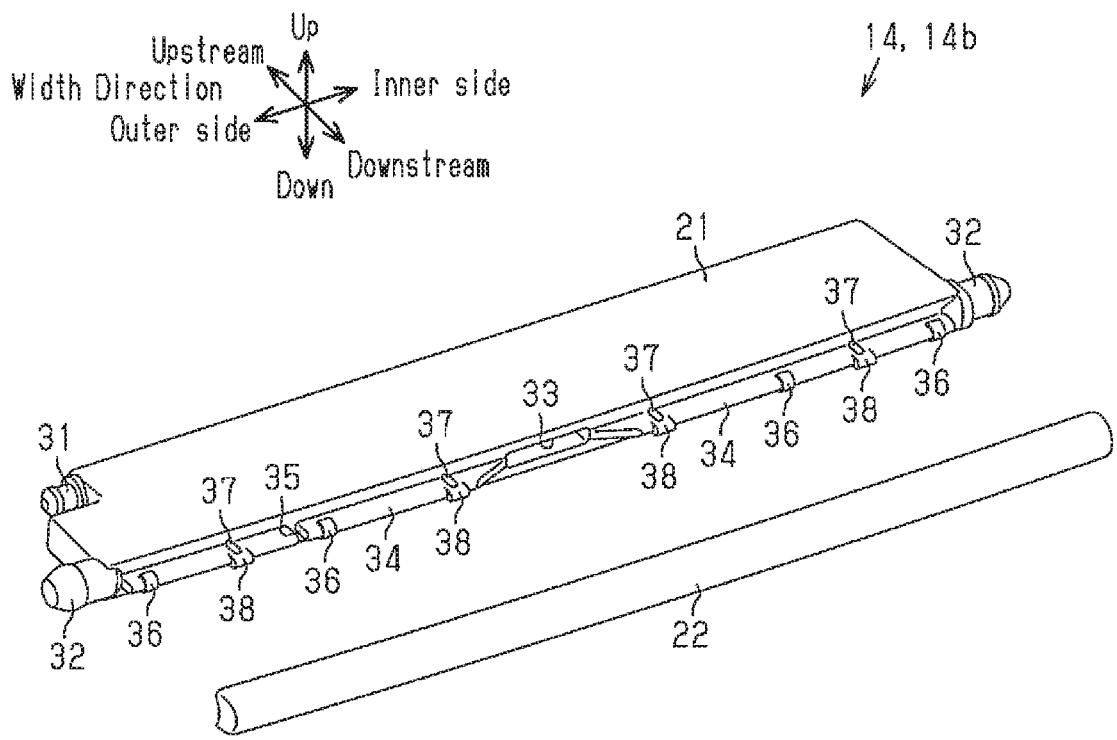
FIG. 2 is an exploded perspective view showing downstream fins serving as air-conditioning register fins.

As shown in FIG. 2, the downstream fin 14 (upper sub-fin 14b) includes an elongated plate-shaped fin main body 21 extending in the width direction and an elongated decorative member 22 extending in the width direction.

Fin Main Body

Referring to FIGS. 2 and 3A to 3G, the fin main body 21 is made of a hard plastic such as polypropylene that includes glass fiber extending in the width direction. The dimension in the width direction of the fin main body 21 is slightly shorter than the dimension between the inner side wall and outer side wall of the air passage 17 in the width direction. A coupling rod 31 coupled to the coupling member (not shown) is provided at the corner of the fin main body 21 that is located on the upstream side and on the outer side in the width direction. The coupling member couples the fin main body 21 of the upper sub-fin 14b to the fin main body 21 of the main fin 14a and the fin main body 21 of the lower sub-fin 14c. In addition, rotation shafts 32 project from the corners of the fin main body 21 that are located on the downstream side and at the opposite ends in the width direction. The fin main body 21 is swingably supported by the inner side wall and outer side wall of the air passage 17 in the width direction with the rotation shafts 32.

A recessed clearance 33 having a rectangular opening is formed in the middle portion in the width direction of the downstream edge of the fin main body 21. The height H2 of the clearance 33 is shorter than the height H1 of the fin main body 21 (H2<H1). Further, the width W2 and the depth L2 of the clearance 33 are sufficiently shorter than the width W1 and the depth L1 of the fin main body 21, respectively (W2<W1, L2<L1).

Further, two projecting portions 34 extend on the downstream edge of the fin main body 21 in the width direction with the clearance 33 in between. The height H3 of the projecting portion 34 is shorter than the height H1 of the fin main body 21 (H3<H1). Each projecting portion 34 includes a distal end 34a. The distal end 34a has a semi-circular cross section defined by the diameter D3, which is equal to the height H3. The projecting portion 34 is formed such that its projecting dimension gradually decreases toward the clearance 33. The downstream edge of the fin main body 21, where the projecting portions 34 are formed, corresponds to one of the edges in the transverse direction. The projecting portion 34 corresponds to a protrusion.

The one of the two projecting portions 34 located on the outer side in the width direction includes a positioning recess 35 recessed so as to divide the projecting portion 34 in the width direction.

In addition, each projecting portion 34 includes multiple engagement projections 36. More specifically, each engagement projection 36 has a semi-circular cross section, in which the distal end 34a is bulged. In other words, each engagement projection 36 is provided on the outer surface of the distal end 34a (projecting portion 34). The diameter D4 of the engagement projection 36 is longer than the diameter D3 of the distal end 34a and shorter than the height H1 of the fin main body 21 (D3<D4<H1). The engagement projection 36 is set such that the projecting dimension L4 from the fin main body 21 is equal to the projecting dimension L3 of the projecting portion 34 (L4=L3). Due to the difference between the diameter D4 of each engagement projection 36 and the diameter D3 of the distal end 34a, the engagement projection 36 includes two engagement surfaces 36a, which are continuous with the upper surface and the lower surface of the projecting portion 34. The two engagement surfaces 36a are inclined such that the distance between the engagement surfaces 36a in the vertical direction gradually increases from the basal end of the projecting portion 34 toward the distal end of the projecting portion 34.

The fin main body 21 includes four engagement projections 36. The four engagement projections 36 are arranged at equal intervals in the width direction together with the clearance 33.

Further, each projecting portion 34 includes multiple first movement limiting parts 37. Each first movement limiting part 37 is formed by two minute protuberances respectively projecting from the upper surface and the lower surface of the projecting portion 34. That is, each first movement limiting part 37 sandwiches the projecting portion 34 from the opposite sides in the vertical direction. The height H5 of the first movement limiting part 37 including the projecting portion 34 is slightly longer than the height H3 of the projecting portion 34 (H5>H3).

In addition, each projecting portion 34 includes multiple second movement limiting parts 38. Each second movement limiting part 38 is located at the position of the corresponding first movement limiting part 37 in the width direction. The second movement limiting part 38 slightly lengthens the projecting dimension of the projecting portion 34 at the position where the second movement limiting part 38 is arranged. That is, the projecting dimension L5 of the second movement limiting part 38 from the fin main body 21 is slightly longer than the projecting dimension L3 of the projecting portion 34 (L5>L3).

The pairs of the first movement limiting part 37 and the second movement limiting part 38 are arranged at equal intervals at four positions between the engagement projections 36 or between the engagement projections 36 and the clearance 33 in the width direction.

Decorative Member

As shown in FIGS. 2 and 4A to 4G, the entire decorative member 22 has a U-shaped cross section so as to open toward the upstream side. The portions of the decorative member 22 that open toward the upstream side are defined as accommodation portions 41. The curved surface of the decorative member 22, which is located on the downstream side and not included in the accommodation portion 41, and the upper surface and the lower surface of the decorative member 22, which extend from the curved surface to the accommodation portion 41, are defined as a design surface 42. The accommodation portion 41 is defined by an inner surface 41a and corresponds to a recess.

The dimension between the upper inner part and the lower inner part of the inner surface 41a of the accommodation portion 41, that is, the opening dimension H6, is slightly longer than the height H3 of the projecting portion 34 of the fin main body 21 and is slightly shorter than the height H5 of the first movement limiting part 37 (H3<H6<H5). Further, the depth 16 of the accommodation portion 41 is slightly longer than the projecting dimension 13 of the projecting portion 34 and is slightly shorter than the projecting dimension L5 of the second movement limiting part 38 (L3<L6<L5). Additionally, the dimension of the design surface 42 between the upper surface and the lower surface, that is, the height H7, is equal to the height H1 of the fin main body 21 (H7=H1).

A rectangular gate portion 43 projects from the middle portion of the decorative member 22 in the width direction toward the upstream side while filling the accommodation portion 41. That is, the gate portion 43 is arranged so as to be arranged between the two accommodation portions 41 in the width direction. The thickness H8 of the gate portion 43 is slightly shorter than the height H2 of the clearance 33 (H8<H2). Further, the width W8 and the projecting dimension L8 of the gate portion 43 are slightly shorter than the width W2 and the depth L2 of the clearance 33, respectively (W8<W2, L8<L2). The inner surface 41a of each accommodation portion 41 includes an inclined surface 41b, which is continuous with the gate portion 43. The inclined surface 41b is inclined such that the depth of the accommodation portion 41 gradually decreases toward the gate portion 43.

A positioning projection 44 is provided on the inner surface 41a of the one of the two accommodation portions 41 that is located on the outer side in the width direction so as to divide the accommodation portion 41 in the width direction. Unlike the gate portion 43, the positioning projection 44 does not project from the opening of the accommodation portion 41 toward the upstream side. The width of the positioning projection 44 is slightly shorter than the width of the positioning recess 35. The positioning projection 44 is located at the position in which the distance from the gate portion 43 corresponds to the distance between the clearance 33 and the positioning recess 35.

The decorative member 22 includes multiple engagement hooks 45. Each engagement hook 45 is formed by two opposed portions projecting from the upper inner part and the lower inner part of the inner surface 41a of the accommodation portion 41. The opposing dimension H9 of the engagement hook 45 is shorter than the diameter D4 of the engagement, projection 36 and longer than the height H3 of the projecting portion 34 (D4>H9>H3).

Due to the difference between the opposing dimension H9 and the opening dimension H6 of the accommodation portion 41, each engagement hook 45 includes two engagement surfaces 45a, which are continuous with the upper inner part and the lower inner part of the inner surface 41a. The two engagement surfaces 45a are inclined so that the opposing dimension gradually increases as the distance from the opening of the accommodation portion 41 increases.

The decorative member 22 includes four engagement hooks 45. The four engagement hooks 45 are arranged at equal intervals in the width direction together with the gate portion 43. That is, the engagement hooks 45 are located in correspondence with the engagement projections 36 in the width direction.

The decorative member 22 is made of plastic such as ABS. The decorative member 22 is formed through injection molding, in which resin is poured into a mold from the gate portion 43 and then becomes solidified. The decorative member 22 is allowed to undergo elastic deformation by a slight amount. The decorative member 22 is immersed in a plating tank in a state in which the gate portion 43 is held for the design surface 42 to become plated.

The attachment of the fin main body 21 and the decorative member 22, that is, the manufacturing of the downstream fins 14, will now be described.

Referring to FIGS. 2 and 5A to 5C, the fin main body 21 and the decorative member 22 are moved toward each other in a state in which the projecting portions 34 are opposed to the openings of the accommodation portions 41. In the width direction, the clearance 33 is opposed to the gate portion 43, the positioning recess 35 is opposed to the positioning projection 44, and the engagement projections 36 are opposed to the engagement hooks 45.

The movement of the fin main body 21 and the decorative member 22 toward each other causes the projecting portions 34 to be accommodated into the accommodation portions 41. When the projecting portions 34 are accommodated in the accommodation portions 41, the gate portion 43 enters the clearance 33 and the positioning projection 44 enters the positioning recess 35.

Further, when the engagement projections 36 enter the accommodation portions 41, the engagement projections 36 push the engagement hooks 45 apart in the vertical direction. When the engagement projections 36 enter the accommodation portions 41 to the positions where the engagement hooks 45 are opposed to the basal ends of the projecting portions 34 in the vertical direction, the engagement hooks 45 undergo elastic recovery. This causes the engagement hooks 45 to hold and engage the engagement projections 36. In this state, the engagement surfaces 36a of the engagement projections 36 and the engagement surfaces 45a of the engagement hooks 45 are engaged in surface contact with each other.

The pairs of the engagement projection 36 and the engagement hook 45 are arranged at four positions in the width direction. Thus, the engagement hooks 45 hold and engage the engagement projections 36 at four positions, the four positions being spaced apart from each other in the width direction of the fin main body 21 and the decorative member 22.

As detailed above, the downstream fin 14, which is an air-conditioning register fin, has the following advantages.

(1) The decorative member 22 includes the accommodation portions 41 (recesses). The decorative member 22 includes the engagement hooks 45 projecting from the inner surfaces 41a of the accommodation portions 41 (recesses). The engagement hooks 45 hold the engagement projections 36 of the fin main body 21. This allows the decorative member 22 to be attached to the fin main body 21 without using adhesive like in the prior art. Thus, the decorative member 22 can be easily attached to the fin main body 21.

(2) The engagement hooks 45 hold and engage the engagement projections 36 at four positions, the four positions being spaced apart from each other in the width direction of the fin main body 21 and the decorative member 22. This limits separation of the decorative member 22 from the fin main body 21.

(3) The projecting portions 34 and the accommodation portions 41 extend in the width direction of the vehicle. This facilitates positioning when attaching the decorative member 22 to the fin main body 21. Even after the attachment, the positional relationship of the fin main body 21 and the decorative member 22 is easily stabilized.

(4) Each projecting portion 34 includes the first movement limiting parts 37 and the second movement limiting parts 38. The first movement limiting parts 37 each have the height H5, which is slightly longer than the opening dimension H6 of the accommodation portion 41. The second movement limiting parts 38 each have the projecting dimension L5, which is slightly longer than the depth L6 of the accommodation portion 41. This keeps the first movement limiting parts 37 and the second movement limiting parts 38 in contact with the inner surface 41a of the accommodation portion 41 with the decorative member 22 attached to the fin main body 21. This limits movement of the fin main body 21 relative to the decorative member 22 even when the air-conditioning register 10 is vibrated through vehicle running. Thus, loosening that occurs between the fin main body 21 and the decorative member 22 is limited.

(5) The fin main body 21 includes the clearance 33. This allows the decorative member 22 to be coupled to the fin main body 21 without a task of removing the gate portion 43, such as breaking off and cutting out the gate portion 43 that is held when plating the design surface 42 of the decorative member 22.

(6) In the decorative member 22, the design surface 42 is plated, and the gate portion 43 can be used as a held portion (contact) for plating. This allows a plated layer to be formed on the design surface 42 as designed.

(7) The positioning recess 35 and the positioning projection 44 are respectively provided only in the projecting portion 34 and the accommodation portion 41, which are located on the outer side in the width direction. Thus, only when attaching the decorative member 22 to the fin main body 21 in a correct position, the fin main body 21 and the decorative member 22 can be attached to each other. That is, when attaching, to the fin main body 21, the decorative member 22 in a state in which the outer side and the inner side in the width direction are reversed, the positioning projection 44 contacts the projecting portion 34. This prevents the decorative member 22 from being attached to the fin main body 21 in an incorrect position.

It should be apparent to those skilled in the art that the present invention may be embodied in many other specific forms without departing from the spirit or scope of the invention. Particularly, it should be understood that the present invention may be embodied in the following forms.

In the above embodiment, the first movement limiting parts 37 may be omitted.

In the above embodiment, the second movement limiting parts 38 may be omitted.

In the above embodiment, the projecting portions 34 may be omitted. In this case, the engagement projections 36 may be provided on the downstream edge of the fin main body 21. Even such a structure allows the engagement hooks 45 to hold the engagement projections 36.

In the above embodiment, the clearance 33 may be omitted. In this case, the gate portion 43 simply needs to be cut off from the decorative member 22.

In the above embodiment, the pairs of the engagement projection 36 and the engagement hook 45 are arranged at four positions in the width direction. The number of the pairs may be changed.

In the air-conditioning register 10 of the above embodiment, the three downstream fins 14 having the same shape are used for each air passage 17. Instead, multiple downstream fins having different shapes may be used depending on the shape of the retainer 11 (air passage 17). For example, when the fin main body 21 and the decorative member 22 are shaped differently for each downstream fin, the positioning recess 35 and the positioning projection 44 are located differently for each downstream fin. This prevents the fin main body 21 and the decorative member 22 used for different downstream fins from being incorrectly attached to each other.

In the above embodiment, the fin main body 21 includes the positioning recess 35, and the decorative member 22 includes the positioning projection 44. These components may be arranged in an opposite manner. That is, the fin main body 21 may include a positioning projection, and the decorative member 22 may include a positioning recess.

In the above embodiment, the decorative member 22 is plated. However, the decorative member 22 does not have to be plated. The decorative member 22 only needs to be colored or have a design surface such that the fin main body 21 is decorated.

In the above embodiment, the decorative member 22 is provided only on the downstream fins 14. Instead, a decorative member may be arranged on the upstream fins 13.

In the above embodiment, the fin main body 21 includes the engagement projections 36, and the decorative member 22 includes the engagement hooks 45 and the accommodation portions 41 (recesses). These components may be arranged in an opposite manner. That is, the decorative member 22 may include an engagement projection, and the fin main body 21 may include a recess that accommodates the engagement projection and an engagement hook projecting from the inner surface of the recess.

Therefore, the present examples and embodiments are to be considered as illustrative and not restrictive and the invention is not to be limited to the details given herein, but may be modified within the scope and equivalence of the appended claims.

The invention claimed is:

1. An air-conditioning register fin configured to be swingably attached to a cylindrical retainer having an air passage for air-conditioning air, the air-conditioning register fin comprising:

an elongated plate-shaped fin main body; and an elongated decorative member attached to one of edges of the fin main body in a transverse direction, wherein one of the fin main body and the decorative member includes a projecting portion that extends in a longitudinal direction of the air-conditioning register fin, the projecting portion includes a distal end and engagement projections, which are provided on an outer surface of the distal end, the distal end has a semi-circular cross section, each engagement projection has a semi-circular cross section, each engagement projection has a diameter that is greater than a diameter of the distal end, the other one of the fin main body and the decorative member includes a recess that extends in the longitudinal direction, and engagement hooks project from an inner surface of the recess, the recess opens toward the projecting portion and accommodates the projecting portion and the engagement projections, each engagement hook is formed by two opposed portions projecting from an upper inner part and a lower inner part of the inner surface of the recess, respectively, and each engagement hook holds and engages a corresponding one of the engagement projections.

2. The air-conditioning register fin according to claim 1, wherein the fin main body includes the projecting portion, and the projecting portion projects toward the decorative member, and the decorative member includes the recess and the engagement hooks.

3. The air-conditioning register fin according to claim 1, wherein the engagement projections are spaced apart from each other in the longitudinal direction, and the engagement hooks are spaced apart from each other in the longitudinal direction.

4. The air-conditioning register fin according to claim 1, wherein the fin main body includes the projecting portion, the decorative member includes the recess and the engagement hooks, the inner surface of the recess includes a positioning projection, the positioning projection does not project from an opening of the recess, the projecting portion includes a positioning recess, the positioning recess divides the projecting portion, and the positioning recess allows entry of the positioning projection only when the decorative member is attached to the fin main body while being in a predetermined position.

5. The air-conditioning register fin according to claim 4, wherein the decorative member includes a gate portion projecting toward the fin main body, and the fin main body includes a clearance that allows entry of the gate portion.

* * * * *